US012684026B2

(12) United States Patent
Bhattacharyya et al.

(10) Patent No.: US 12,684,026 B2
(45) Date of Patent: Jul. 14, 2026

(54) UNPLANNED REMOTE COLLABORATION

(71) Applicant: International Business Machines Corporation, Armonk, NY (US)

(72) Inventors: Anamitra Bhattacharyya, Chelmsford, MA (US); Krishnamohan Dantam, Chelmsford, MA (US); Manjunath Makonahalli, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/932,675

(22) Filed: Sep. 16, 2022

(65) Prior Publication Data

US 2024/0098122 A1 Mar. 21, 2024

(51) Int. Cl.
| | |
|---|---|
| *G06Q 10/10* | (2023.01) |
| *H04L 9/40* | (2022.01) |
| *H04L 65/403* | (2022.01) |

(52) U.S. Cl.
CPC ........ *H04L 65/403* (2013.01); *H04L 63/0876* (2013.01); *H04L 63/107* (2013.01)

(58) Field of Classification Search
None
See application file for complete search history.

(56) References Cited

U.S. PATENT DOCUMENTS

| | | | | |
|---|---|---|---|---|
| 11,570,220 B1 * | 1/2023 | Norheim | ............... | H04L 65/403 |
| 2014/0136439 A1 * | 5/2014 | Galvin, Jr. | ..... | G06Q 10/063118 |
| | | | | 705/321 |
| 2019/0004639 A1 * | 1/2019 | Faulkner | ................. | G06F 3/048 |
| 2019/0205839 A1 | 7/2019 | Dotan-Cohen | | |
| 2019/0342107 A1 | 11/2019 | Vogel | | |
| 2020/0302344 A1 * | 9/2020 | Just | .................. | G06Q 10/06312 |
| 2021/0185105 A1 * | 6/2021 | Van Wie | ................. | A63F 13/12 |
| 2022/0006813 A1 | 1/2022 | Jorasch | | |
| 2022/0070240 A1 | 3/2022 | Yerli | | |
| 2022/0101264 A1 * | 3/2022 | Yin | ........................... | G06N 3/09 |
| 2022/0321507 A1 * | 10/2022 | Skuratowicz | ......... | G06F 3/0481 |
| 2023/0066845 A1 * | 3/2023 | Nagar | .................. | G06Q 10/101 |

* cited by examiner

*Primary Examiner* — Natisha D Cox
(74) *Attorney, Agent, or Firm* — Daniel M. Yeates

(57) ABSTRACT

A computer-implemented method to initiate unplanned interactions for remote workers. The method includes identifying a plurality of user accounts, where each user account is associated with a communication device and a physical location. The method further includes determining a location of each communication device within each physical location. The method also includes generating, for each user account, a collaboration score, where the collaboration scores are based on the location of each communication device. The method includes determining a first collaboration score of a first user account and a second collaboration score of a second user account are above a collaboration threshold. The method also includes initiating, based on the first collaboration score and the second collaboration score being above the threshold, a communication channel between a first communication device and a second communication device.

16 Claims, 5 Drawing Sheets

100

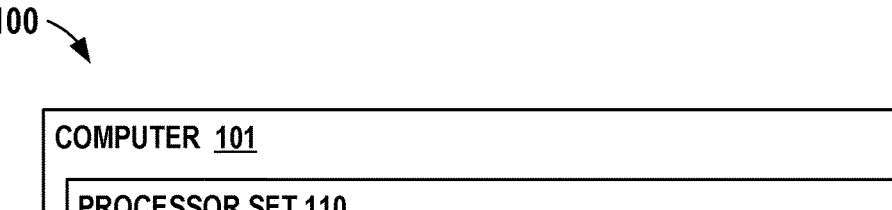

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

INITIATING UNPLANNED COMMUNCATION BETWEEN REMOTE PARTIES 200

PERIPHERAL DEVICE SET 114

UI DEVICE SET 123

STORAGE 124

SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

HOST 205

COLLABORATION MANAGER 210

SCORE GENERATOR 212

APPLICATION 214

COLLABORATION SETTINGS 216

NETWORK 240

REMOTE LOCATION 220

WORKSTATION 221

VR (COMMUNATIO) DEVICE 222

IoT DEVICE 223

REMOTE NETWORK 224

REMOTE LOCATION 230

WORKSTATION 231

VR (COMMUNATIO) DEVICE 232

IoT DEVICE 233

REMOTE NETWORK 234

300

305

ROOM A 310

ROOM B 320

305

ROOM C 330

ROOM D 340

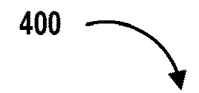
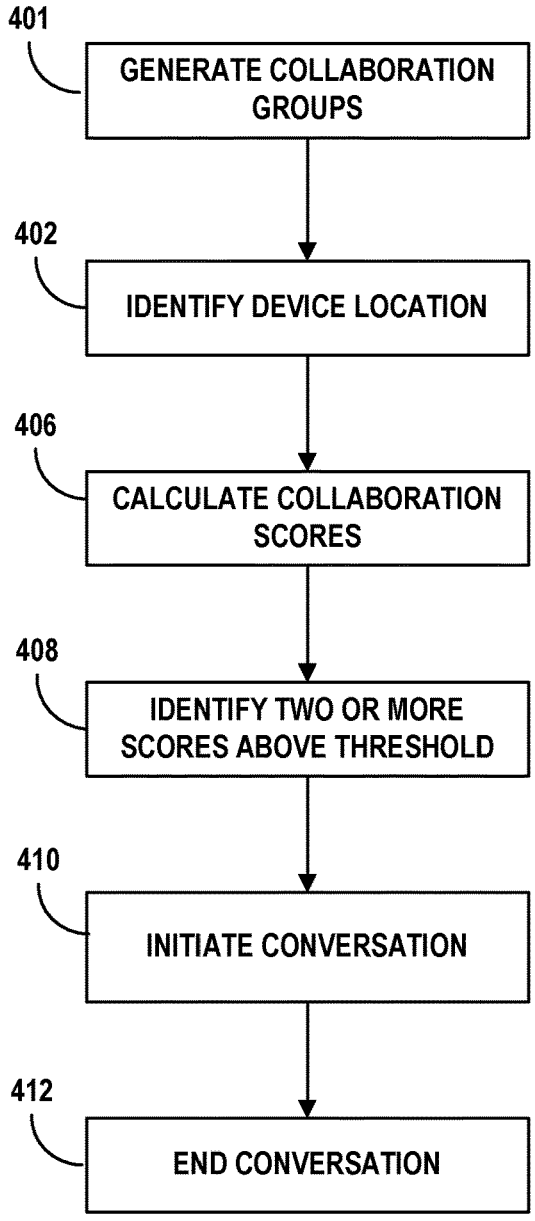
401 GENERATE COLLABORATION GROUPS
402 IDENTIFY DEVICE LOCATION
406 CALCULATE COLLABORATION SCORES
408 IDENTIFY TWO OR MORE SCORES ABOVE THRESHOLD
410 INITIATE CONVERSATION
412 END CONVERSATION
FIG. 4

UNPLANNED REMOTE COLLABORATION

BACKGROUND

The present disclosure relates to virtual communications, and, more specifically, to initiating unplanned collaboration between two or more remote parties.

Upgrades in technology have increased the availability and productivity of remote work. This allows for work that previously could have only been completed in a commercial office setting can now be completed by the same persons working at home or other remote locations.

SUMMARY

Disclosed is a computer-implemented method to initiate unplanned interactions for remote workers. The method includes identifying a plurality of user accounts, wherein each user account is associated with a communication device, and each user account is associated with a physical location. The method further includes determining a location of each communication device within each physical location. The method also includes generating, for each user account of the plurality of accounts, a collaboration score, wherein each collaboration score is based on the location of each communication device. The method includes determining a first collaboration score of a first user account and a second collaboration score of a second user account are above a collaboration threshold. The method also includes initiating, based on the first collaboration score and the second collaboration score being above the threshold, a communication channel between a first communication device associated with the first user account and a second communication device associated with the second user account. Further aspects of the present disclosure are directed to systems and computer program products containing functionality consistent with the method described above.

The present Summary is not intended to illustrate each aspect of every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 1 is a block diagram of a computing environment suitable for initiating unplanned communication for remote users, in accordance with some embodiments of the present disclosure.

FIG. 4 illustrates a flow chart of an example method to initiate unplanned communication between two remote users, in accordance with some embodiments of the present disclosure.

DETAILED DESCRIPTION

Figure 2:
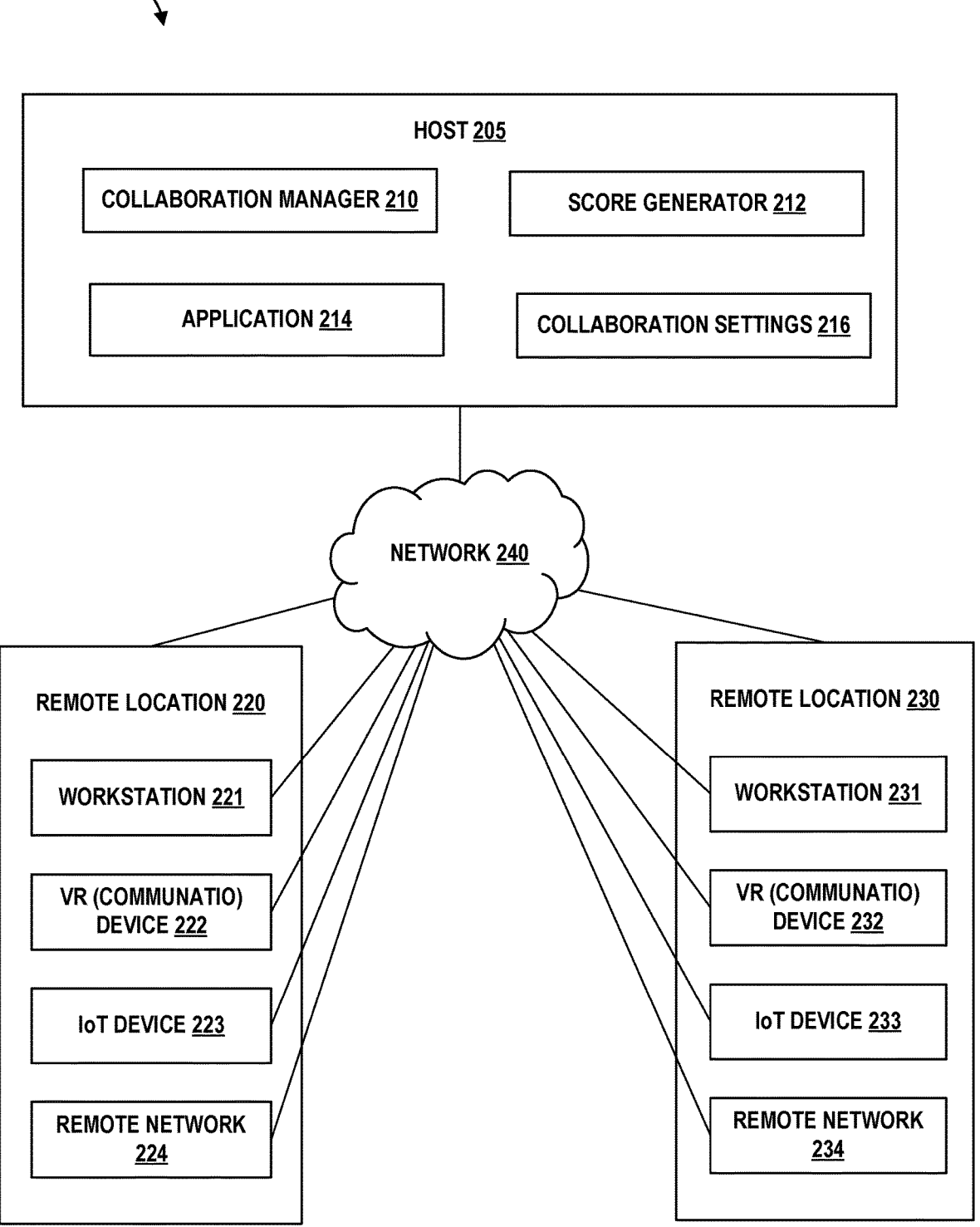
FIG. 2 is a block diagram of a computing environment suitable for operation of a collaboration manager, in accordance with some embodiments of the present disclosure.

The present disclosure relates to virtual communications, and, more specifically, to initiating ad-hoc conversations based on location.

In order to better simulate an in-office environment for remote workers, embodiments of the present disclosure initiate ad-hoc/unplanned interactions between two or more persons to simulate in office communications.

FIG. 1 is a block diagram of a computing environment suitable for initiating unplanned communication for remote users. Computing environment 100 contains an example of an environment for the execution of at least some of the computer code involved in performing the inventive method, such as initiating unplanned conversations for remote parties in block 200. In addition to such as initiating unplanned conversations for remote parties in block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and initiating unplanned conversations for remote parties in block 200, as identified above), peripheral device set 114 (including user interface (UI), device set 123, storage 124, and sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. Performance of a computer-implemented method may be distributed among multiple computers and/or between multiple locations. On the other hand, in this presentation of computing environment 100, detailed discussion is focused on a single computer, specifically computer 101. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Sensor set 125 is made up of sensors that can be used in Internet of Things or other applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Upgrades in technology have increased the availability and productivity of remote work. This allows for work that previously could have only been completed in a commercial office setting can now be completed by the same persons working at home or other remote locations. Chat and/or meeting applications have replaced some of the collaboration that previously would occur through face-to-face interactions. However, there is still some benefit lost by not having face to face interactions/collaboration. One example is ad-hoc and/or unplanned conversations. These ad-hoc discussions can include informal brainstorming and idea exchange that may be beneficial to solving a problem or completing an assigned task. Additionally, the unplanned interaction can spur non-work-related conversation. This may lead to higher morale and/or relationship building that goes beyond the workplace. The long-term effect can be more effective and efficient employees.

In order to better simulate an in-office environment for remote workers, embodiments of the present disclosure initiate ad-hoc/unplanned interactions between two or more persons to simulate in office face to face communications. Embodiments of the current disclosure may simulate unplanned conversations between two or more parties. The collaboration manager can identify times and/or situations when a user is likely to initiate and/or responded to an unplanned communication. The identified times and/or situations can attempt to imitate times in the office when unplanned conversations would occur. For example, the collaboration manager may initiate a conversation when the user is getting a snack and/or a beverage. Embodiments of the present disclosure can increase the productivity of remote workers by simulating unplanned/ad-hoc conversations that lead and contribute to the productivity and/or morale of the worker.

In some embodiments, the collaboration manager identifies scenarios when a user is likely to initiate an unplanned interaction, and/or accept an invitation into an unplanned interaction. The scenarios can be based on a location in the remote work location, on tasks, on time of day, and/or other similar factors. The collaboration manager can monitor the actions and location of the users within the remote working environment. In some embodiments, the collaboration manager can generate/calculate a collaboration score. The collaboration score can indicate a likelihood the user will participate in (e.g., initiates and/or respond to) an unplanned communication.

In some embodiments, the scenarios may be based on the location within the remote working environment. The remote working environment can be any building/area where a person is performing work for an organization. In some embodiments, the remote location can be divided into different zones/room. In some embodiments, various locations/rooms within the remote working environment may be designated as collaboration areas. Unplanned communications may be initiated in the designated collaboration areas. In some embodiments, all areas of the remote work area have a designation (e.g., collaboration area, non-collaboration area, etc.). Said differently, each location in the remote workspace can have a predetermined effect on a collaboration score. For example, areas that resemble a break room in the office, such as a kitchen, can have a relatively larger effect on the collaboration score than the location surrounding a workstation. In some embodiments, the collaboration manager monitors/determines the location of the user in the remote work environment. The location can be determined by GPS, and/or IoT devices.

In some embodiments, the scenarios are based on activities/tasks of the user. The activities/tasks can be determined by one or more of IoT devices, running applications, work calendars, current actions (e.g., typing, walking, etc.), and the like. In some embodiments, the current activity can be one factor in the collaboration score. For example, a user that is currently at a workstation and actively typing would have a relatively lower score than when the user is away from the workstation.

In some embodiments, the collaboration manager can monitor two or more different workers in different remote locations. In some embodiments, the collaboration manager can determine/identify when two or more different users are likely to accept an interaction request. In some embodiments, the collaboration manager can create/identify groups for the various users/user accounts. The groups can be configured to include accounts that may interact. The groups can be based on projects, previous interactions, be predefined, and the like. For example, all accounts that have access to a particular project folder can be part of one group.

In some embodiments, a collaboration manager initiates a method of communication between two or more parties. The communication method can include any known or future developed method of remote communication between two or more persons The communication methods can include virtual reality, augmented reality, video calls, chat applications, and other similar occasion methods.

In some embodiments, the initiation includes connecting the two parties. For example, the collaboration manager may start a video chat between the parties. In some embodiments, initiation can include a notification. The notification can indicate another party is available. For example, the notification may say "Mary is available for a conversation." The conversation can be initiated based on an input of acceptance from one or both parties. In some embodiments, the two or more parties are both included in at least one group.

In some embodiments, the collaboration manager determines when a third user is in a position to join the conversation. For example, the third user may change locations so their collaboration score increases above the collaboration threshold. The collaboration manager can add the third user to the conversation. In some embodiments, the third user is automatically added to the conversation. In some embodiments, the third user is added by one or more of the current members.

In some embodiments, the collaboration manager allows a current conversation to be locked (e.g., prevents any third party from listening/joining to the conversation). In some embodiments, the collaboration manager can initiate two different conversations simultaneously. In some embodiments, the collaboration manager can combine two or more conversations into a single conversation and/or divide one conversation into two or more conversations.

In some embodiments, the collaboration manager includes a virtual reality/augmented reality system. Each user may have a unique virtual reality system. The virtual reality system may allow each user to view an avatar of the person they are in communication with. Additionally, the virtual world reality system can show participants from a second conversation occurring in the area. However, in some embodiments, there will be no sound interference between the multiple conversations until/unless they are merged into a single conversation. Thus, embodiments of the present disclosure can mimic/imitate informal and/or unplanned office communications. This can provide some of the benefits of the office environment while still allowing the workers to be in a remote location. In some embodiments, the collaboration manager can generate an avatar for each participant in the conversation. The avatar can better simulate face to face interaction than a chat application or a phone call.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 2 is a representation of a remote collaboration environment 250, that is capable of running a collaboration manager (or initiating unplanned conversations for remote parties in block 200 in FIG. 1) in accordance with one or more embodiments of the present disclosure. Many modifications to the depicted environment may be made by those skilled in the art without departing from the scope of the disclosure.

Computing environment 250 includes host 205, remote location 220, remote location 230, and network 240. In some embodiments, collaboration environment 250 can have any number of remote locations, however, only two are shown for discussion purposes.

Network 240 can be, for example, a telecommunications network, a local area network (LAN), a wide area network (WAN), such as the Internet, or a combination of the three, and can include wired, wireless, or fiber optic connections. Network 240 may include one or more wired and/or wireless networks that are capable of receiving and transmitting data, voice, and/or video signals, including multimedia signals that include voice, data, and video information. In general, network 240 may be consistent with WAN 102 of FIG. 1. In some embodiments, each of host 205, and each subcomponent computing device in each remote network location may include a computer system, such as computer 101 of FIG. 1.

Host 205 may be a standalone computing device, a management server, a web server, a mobile computing device, or any other electronic device or computing system capable of receiving, sending, and processing data. In other embodiments, host 205 can represent a server computing system utilizing multiple computers as a server system, such as in a cloud computing environment (e.g., computing environment 100). In some embodiments, host 205 may be included in one or more remote location 220, remote location 230, and/or any additional remote locations. In some embodiments, host 205 includes collaboration manager 210, score generator 212, application 214, and collaboration settings 416.

Collaboration manager 210 can be any combination of hardware and/or software configured to initiate unplanned or ad-hoc conversation between two or more parties in different physical locations. Some embodiments may be consistent with initiating unplanned conversations for remote parties in block 200 of FIG. 1. In some embodiments, collaboration manager 210 can add a third party to an existing conversation, and/or divide a conversation into two or more separate conversations. In some embodiments, collaboration manager 210 includes and/or is included in one or more of score generator 212, application 214, and collaboration settings 216.

In some embodiments, collaboration manager 210 can create/identify groups for the user accounts. The groups can represent accounts that may have a reason to interact. The interaction can be based on a common project, an assigned office location, an organization (e.g., common manager, etc.), and the like. Any account can be included in any number of groups, and any group can have any number of user accounts.

Score generator 212 can be any combination of hardware and/or software configured to generate a collaboration score. In some embodiments, score generator 212 calculates/determines a collaboration score for each user account at remote location 220. In some embodiments, the collaboration score represents a likelihood a particular user will join in an unplanned conversation. Generally, the higher the collaboration score, the more likely collaboration manager 210 is to initiate unplanned conversation. In some embodiments, the collaboration score indicates a set of conditions are satisfied to join an unplanned conversation. In some cases, all of the one or more conditions need to be satisfied, while in other cases, only a subset of the conditions need to be satisfied. The subset can be a percentage/number (e.g., 2 out of 3, or 50%, etc.). The subset can also be a combination of the prior. For example, one embodiment may require conditions A, and two out of four of conditions B, C, D and E. In some embodiments, the conditions can be different for different users/remote locations. The conditions can change based on time of day, day of week, and other factors.

In some embodiments, the factors can include location within the remote location, time of day, and/or day of week. Or, said differently, a threshold (the number of conditions) can be different based on different factors. For example, on a weekend, the score must be very high to initiate, relative to a workday.

Application 214 can be any combination of hardware and/or software configured to carry out a function on a computing device (e.g., host 205). In some embodiments, application 214 is a web application. In some embodiments, application 214 is a communications application that allows for conversations between two or more remote parties (e.g., videoconferencing, telephone, etc.). In some embodiments, application 214 can include a virtual office simulator (VOS). The VOS can be any program that simulates part or all of an in-office scenario from a remote work location. In some embodiments, application 214 is a VR/AR application. In some embodiments, application 214 is a digital communication tool (e.g., chat application, etc.). In some embodiments, the communication tool can monitor various interactions between the various users at each remote location. For example, application 214 can provide to collaboration manager 210 and/or score generator 212 when and/or how various users interact using application 214. In some embodiments application 214 can include one or more groups. The groups can be based on permissions to particular files/threads/information. For example, each account that has access to a particular set of information can be considered in a group. In some embodiments, the interactions on application 214 can be used to generate the groups. Recent and/or frequent interaction between accounts can lead to the accounts being in a common group. For example, for a first user account one group can be any other account that has a direct message within 30 days.

Collaboration settings 216 can be any combination of hardware and/or software configured to store settings and/or historical data relating to collaboration conditions. In some embodiments, collaboration settings 416 includes location designations for remote location 220. Various locations in the remote workplace can be designated as different area types. Location designations are discussed in further detail with regard to FIG. 3 below.

Figure 3:
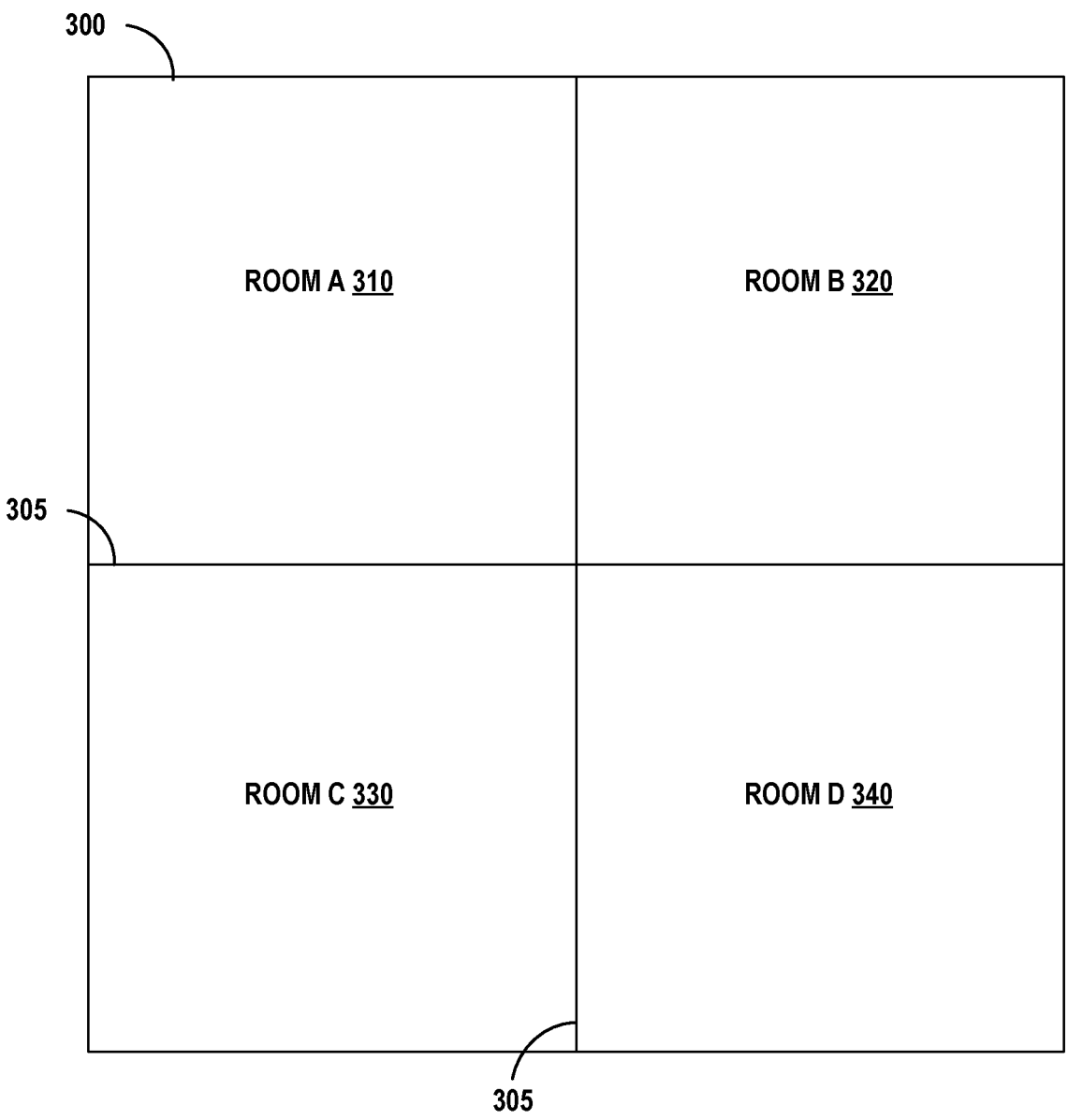
FIG. 3 is a block diagram of a remote location with room designations, in accordance with some embodiments of the present disclosure.

FIG. 3 is a simplified layout of a remote workplace. The remote workplace can be a home, a different office, a public building, and the like. In some embodiments, remote workplace can include two or more different rooms (or physical areas with different designations). At least one of the two or more rooms (or area designations) is designated as a common space, or a space where unplanned interactions can be initiated. FIG. 3 includes layout 300, room boundary 305, room A 310, room B 320, room C 330, and room D 340. Layout 300 is a simplified top-down layout of a remote work location (e.g., remote location 220, remote location 230, etc.). Boundary 305 can be a boundary between the various rooms on layout 300. Boundary 305 can represent physical and/or imaginary/defined boundaries for each room/area. Each of room A 310, room B 320, room C 330, and room D 340 can be correlated to an area in the remote workplace. The correlations can be based on the type of room. For example, in one embodiment, room A 310 can be an office/workstation, room B 320 can be a kitchen, room C 330 can be a living room, and room D 340 can be a bedroom. In some embodiments, the designation can be selected from a predetermined set of designations. Each designation has a predetermined effect on the collaboration score. For example, room A 310 the office can lead to a relatively lower score than room B 320, the kitchen. Because the kitchen can be designated as an area at the office where a person is more likely to start an unplanned conversation.

In some embodiments, collaboration setting 216 includes groups settings. The group setting can be a policy for any number of users. The users may be part of an organization, sub-organization, project team, have similar office space, and the like. The group settings may include which users may interact with each other both in the office and at any remote location. In some embodiments, the group settings can be based on each user's work history and one or more applications (e.g., chat application video conferencing, etc.). For example, a user may be in the group of another user if they have communicated on a chat application within a predetermined period of time. In another example, any users assigned access to a project folder, indicating some collaboration, may be considered a group. In a third example, any users that connected with an email (e.g., sender, recipient, etc.) may be considered a group. Each group may have a different effect on the collaboration score for the users.

In some embodiments collaboration settings 216 includes predefined groups. The groups can be user account specific. In some embodiments, collaboration settings 216 can include rules for each user account. The rules can designate room types and/or specific room, times, days, tasks, and the like that indicate when the associated user is willing to participate in unplanned communication. These can become factors in the collaboration score for each user account.

Remote location 220 represents any physical location that is different than remote location 230 and any other remote location within collaboration environment 250. Remote location 220 can be a home, an office space (employer provided or personal), a public location (e.g., public library) and/or any other physical location. Each remote location is in a physically different location than each of the other remote locations, such that there is little change of unplanned conversations occurring. In some embodiments, remote location 220 is divided into one or more rooms as discussed in relation to FIG. 3.

In some embodiments, remote location 220 includes a workstation 221, VR device 222, IOT device 223, and remote network 224. Workstation 221, VR device 222, IOT device 223, and remote network 224 may be separate computing devices such as computer 101 of FIG. 1 and/or combined into one or more computing devices. Workstation 221, VR device 222, and IOT device 223 may connected to each other and/or to host 205 and remote location 230 via network 240 individually and/or collectively.

Workstation 221 can be any computing used by one or more users. In some embodiments, workstation 221 is located in a specified location within the remote location. For example, workstation 221 can be located in a room A office. In some embodiments, workstation 221 is in a designated area where unplanned interaction will not occur. As such, when a user is located at workstation 221 the collaboration score may be very low.

VR device 222 can be any combination of hardware and software configured to allow communications between two or more remote persons. In some embodiments, VR device 222 includes a VR/AR system. The VR system simulates an in-office environment such that the user may feel they are in the office rather than at remote location 220. In some embodiments, VR device 222 can be any computing device capable of allowing communication between two more people (e.g., a smart phone, a laptop and Webcam, telephone, etc.). In some embodiments, VR device 222 can send and/or receive notifications the user. The notifications can be audio and/or visual indicators. The notifications are configured to notify the user unplanned conversations are available and/or additional parties are requesting to join an ongoing conversation.

IOT device 223 can be any combination of hardware and/or software configured to identify a location of a user within remote location 220. In some embodiments, remote location 220 has two or more IOT devices. IOT device 223 can have one or more sensors configured to and identify the location within the home. The sensor can include cameras, heat sensors, motion detectors, and the like. In some embodiments IOT device 223 continues network signals to determine the location. For example, IOT device 223 determines a local network connection and can correlate that connection point to a room within remote location 220. In some embodiments, IOT device 223 is correlated to a specific room or and/or room type. In some embodiments IOT device 223 is a single device. In some embodiments, IoT device 223 is two or more separate IoT devices. The IOT devices are configured to identify a location of the user within the remote location. In some embodiments, IOT device 223 sends location information to collaboration manager 210 (or collaboration manager 210 can receive location information from IOT device 223). In some embodiments, IOT device 223 includes GPS and/or other location devices. The GPS/location device and identify a room in which the device is located within the remote location.

Remote network 224 can be any combination of hardware and/or software configured to allow communications between and among workstation 221, VR device 222, IOT device 223, and any other computing devices within remote location 220. In some embodiments, remote network 224 can interface with any other network (e.g., network 240, remote network 234, etc.). In some embodiments, remote network 224 can connect each device within remote location to 220 network 240. In some embodiments, remote network 224 can be consistent in design and operation with network 240.

Remote location 230 can be any physical location different than remote location 220. In some embodiments, the different location can be a different building. The different physical location can be any location where unplanned face to face interaction is unlikely to occur during a normal routine. In some embodiments, remote location 230 can have workstation 231, VR device 232, IOT device 233, remote network 234. Remote location 230 can be consistent with remote location 220. In some embodiments, remote location 230 can have the same a set components as remote location 220. In some embodiments, remote location 230 has a different set of components than remote location 220. For example, one remote location may have more or fewer IOT devices a second location. The number of IOT devices can be based on the configuration of the remote location rather than any predefined criteria. In some embodiments, VR device 232 can be the same as device 222. However, the communication between device 222 and VR device 232 can be through two different devices. For example, a first user may be on a smart phone and a second user on a laptop.

In some embodiments, collaboration environment 250 includes additional remote locations (not shown). There can be a remote location for each user in a group. One or more of the devices within each remote location can send the location and/or task information for the user in that location to collaboration manager 210.

FIG. 4 depicts a flowchart of an example method, method 400, for initiating unplanned interaction/conversations that can be performed in a computing environment (e.g., computing environment 100 and/or collaboration environment 250). One or more of the advantages and improvements described above for initiating unplanned interactions/conversations may be realized by method 400, consistent with various embodiments of the present disclosure.

Method 400 can be implemented by one or more processors, host 205, collaboration manager 210, score generator 212, application 214, collaboration settings 216, workstation 221, VR device 222, IoT device 223, remote network 224, workstation 231, VR device 232, IoT device 233, remote network 234 and/or a different combination of hardware and/or software. In various embodiments, the various operations of method 500 are performed by one or more of host 205, collaboration manager 210, score generator 212, application 214, collaboration settings 216, workstation 221, VR device 222, IoT device 223, remote network 224, workstation 231, VR device 232, IoT device 233, remote network 234. For illustrative purposes, the method 400 will be described as being performed by collaboration manager 210.

At operation 401, collaboration manager 210 generates collaboration groups. In some embodiments, there can be any number of collaboration groups. Each collaboration group includes any number of users/user accounts/account. In some embodiments, the groups can be based on usage of an application (e.g., application 214). The accounts in each group have a common factor/tasks. The factors can be a business unit, a project, in office vicinity, and the like. In some embodiments, the groups can be based on recent and/or ongoing communications. The communications can take place in any communication application (e.g., application 214). For example, all recipients on an email chain can be in a group. In another example, each account that has access to a particular folder, work page, information channel, can be considered a group. In some embodiments, the groups can be predefined by an administrator and/or by each user individually. Each account can be in any number of groups.

At operation 402, collaboration manager 210 identifies a location of each VR device (e.g., VR device 223 and VR device 233). In some embodiments, the identification is based on information received from a remote location. The location information can be based on information from one or more IOT devices and/or a GPS device at the remote location. In some embodiments, the location received is a room designation and/or a room type. For example, the location can be determined by a computing device at the remote location, and only the location designation is sent to the collaboration manager 210. The room designation can indicate if it is a location to compatible with initiating unplanned conversations. For example, if the determined location is at the workstation, then designation would be a noncompatible location; but if the determined location is in the kitchen, then the designation would be a compatible location.

The operation 406, collaboration manager 210 calculates a collaboration score for each user. The collaboration score can indicate a likelihood and/or unavailability of the user to participate in an unplanned conversation/interaction. In some embodiments the collaboration score is based on the identified location. Specific location designations and/or room types and have a predetermined effect on the collaboration score.

In some embodiments, the collaboration score is based on activities of the user. The activities can be currently and recently performed activities, such as applications used, test perform, and the like. In some embodiments, the location is the largest factor in the collaboration score. In some embodiments, the activities can incorporate calendar events, upcoming tasks, and other similar data. For example, if the calendar for a user shows a meeting will start soon, this may cause the collaboration score to be relatively lower compared to when the user has no meetings scheduled.

At operation 408, collaboration manager 210 identifies two or more collaboration scores above a predetermined threshold. In some embodiments, the predetermined threshold is solely based on location. In some embodiments, the predetermined threshold includes two or more factors where all or some of the factors are satisfied to exceed the threshold.

At operation 410, collaboration manager 210 initiates a communication channel/communication session between the identified devices. In some embodiments, the communication channel can be based on user accounts associated with the communication devices. The identified devices can be any number of devices with collaboration scores above the threshold. In some embodiments, the initiation includes automatically opening a communications channel (e.g., starting a video chat, starting a phone call, etc.). In some embodiments, the initiation sends a notification or a push notification to the identified VR devices. The communications channel can be initiated in response to an affirmative input from the various users. Thus, embodiments of the present disclosure can emulate bumping into a colleague at a common location in the office. This can lead to the exchange of ideas in a more informal setting that may lead to additional problem-solving and task completion. The use of the collaboration score, in particular the location, reduces the likelihood the unplanned interaction will be a distraction from normal workflow. Or, said differently, the unplanned interactions are configured to occur only when a user is not active in a current task.

An operation 412, collaboration manager 210 closes/ends and the communication channel/communication session. In some embodiments, the session is ended in response to the collaboration score falling below the threshold. In some embodiments, the session is ended when a user leaves/changes locations within the remote work location. In some embodiments, the communication session is ended in response to an end command received from a communication device. This can be received from a user by touch and or/or voice commands to end the communication session.

Figure 5:
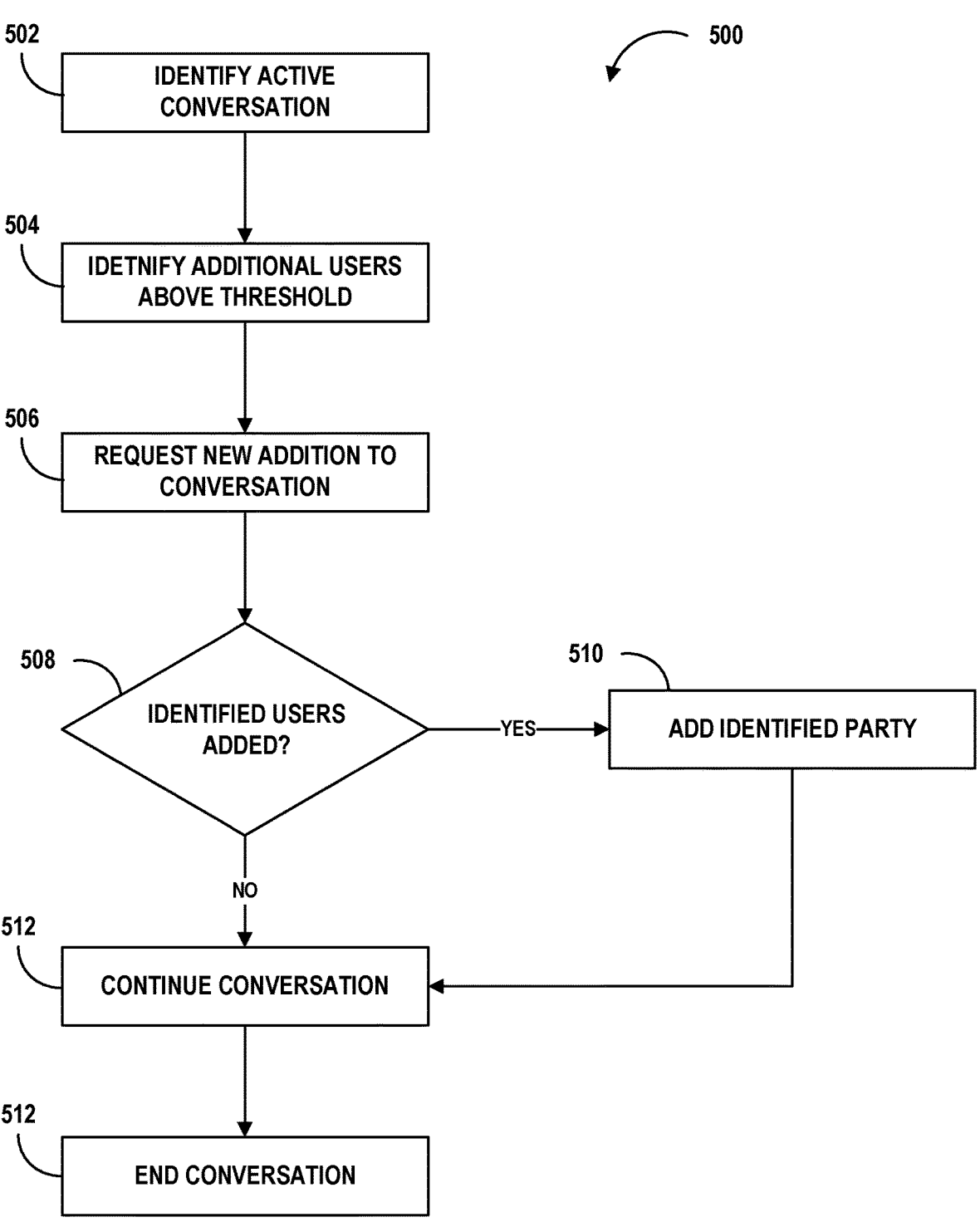
FIG. 5 illustrates a flow chart of an example method to add a third user to an existing conversation, in accordance with some embodiments of the present disclosure.

FIG. 5 depicts a flowchart of an example method, method 500, for adding a third a party to an ongoing unplanned conversation that can be performed in a computing environment (e.g., computing environment 100 and/or collaboration environment 250). One or more of the advantages and improvements described above for initiating unplanned interactions/conversations may be realized by method 500, consistent with various embodiments of the present disclosure.

Method 500 can be implemented by one or more processors, host 205, collaboration manager 210, score generator 212, application 214, collaboration settings 216, workstation 221, VR device 222, IoT device 223, remote network 224, workstation 231, VR device 232, IoT device 233, remote network 234 and/or a different combination of hardware and/or software. In various embodiments, the various operations of method 500 are performed by one or more of host 205, collaboration manager 210, score generator 212, application 214, collaboration settings 216, workstation 221, VR device 222, IoT device 223, remote network 224, workstation 231, VR device 232, IoT device 233, remote network 234. For illustrative purposes, the method 500 will be described as being performed by collaboration manager 210.

At operation 502, collaboration manager 210 identifies an active conversation. In some embodiments, the active conversation can be any conversation between two or more remote users (or user accounts), where remote is separate from each other and/or separate from a third party (third user account) not participating in the conversation. In some embodiments, the active conversation can be a conversation at operation 408 of method 400. In some embodiments, operation 502 includes operations 402-408 of the method 400.

At operation 504, collaboration manager 210 identifies one or more additional users with a collaboration score above the threshold. In some embodiments, operation 504 includes updating the collaboration score for various additional users. Operation 504 may also include calculating collaboration scores for users that just signed onto the collaboration system. In some embodiments, the identification can be based on the one or more users changing locations within their remote environment. For example, a third user may leave their office and enter the kitchen, which is designated as a collaboration space.

At operation 506, collaboration manager 210 requests the one or more of the identified users to join the ongoing conversation. In some embodiments, the request includes a notification to one or more of the active parties in the conversation. This can allow for some privacy in communications that simulates real world interactions. For example, if two persons are having a discussion, they can stop and/or change the subject when a third person approaches. The notification can simulate the approaching third party to allow for time to move to a more secure location (or lock the active conversation) or change the subject. In some embodiments, the one or more identified users can be automatically added to the conversation. For example, collaboration manager 210 can add the one or more identified users to the virtual meeting.

In some embodiments, collaboration manager 210 can send the notification to the one or more identified parties. The notification can include the participants in the current conversation, and/or a topic of conversation. The identified user may then request to join the conversation.

At operation 508, collaboration manager 210 determines if the one or more identified parties should be added to the conversation. In some embodiments, the determination is based on input from the one or more identified users and/or some or all of the participants of the active conversation. In some embodiments, the determination can be based on predefined setting. For example, the participants in a conversation may mark a current conversation as private or non-private. Non-private will allow any and all additional users into the conversation and private will prevent any person from joining. If it is determined that the one or more identified parties should be admitted into the conversation (508: YES), then collaboration manager 210 proceeds to operation 510. If it is determined that the one or more identified parties should not be admitted to the conversation (508: NO), then collaboration manager 210 proceeds to operation 512.

At operation 510, collaboration manager 210 adds the one or more identified parties to the conversation. In some embodiments, the addition includes opening a line of communication between all parties in the current conversation. The command line of communication can be facilitated by each respective users VR device (or other communication device). In some embodiments, operation 510 can be consistent with operation 408 of method 400.

At operation 512, collaboration manager 210 continues the current conversation. The conversation can continue as long as two or more of the parties maintain the communication channel to be open. Operation 514, collaboration manager 210 ends the conversation. In some embodiments, operation 514 can be consistent with operation 410 of method 400.

The method 500 allows for additions of relevant persons into ongoing conversations. This further increases collaboration between multiple people, even when each participant is in a separate physical location.

In some embodiments, method 500 can be adapted to merge to existing conversations. In some embodiments, collaboration manager 210 can identify multiple active conversations. Collaboration manager 210 may also identify collaboration scores are above the threshold. Rather than adding a single user or multiple users, collaboration manager 210 can add users from a second conversation to form a conversation with at least four separate users. In some embodiments, collaboration manager recommends the combination in response to determining overlap of topics between the two different conversations. The overlap of topics can be based on group members, recent activities, applications recently used, and the like.

Embodiments of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method comprising:

identifying a plurality of user accounts, wherein each user account is associated with a communication device, and each communication device is associated with a different physical location;

determining the location for at least two of the communication devices within each physical location moves to a room designated as a collaboration space from a room designated as a workstation, wherein the room designated as a collaboration space is not designated as a workstation and the room designated as a collaboration space is a location compatible with initiating unplanned conversations;

generating, for the at least two accounts of the plurality of accounts, a collaboration score, wherein each collaboration score is based on the location of each communication device;

determining a first collaboration score of a first user account and a second collaboration score of a second user account are above a collaboration threshold;

initiating, automatically and based on the first collaboration score and the second collaboration score being above the threshold, an unplanned communication channel between a first communication device associated with the first user account and a second communication device associated with the second user account;

determining, in response to the initiating, that a third user account of the plurality of user accounts has a third collaboration score above the threshold;

sending a notification to the first communication device and the second communication device through the unplanned communication channel, wherein the notification includes an owner of the third user account, and an indication the third user account is available to join the unplanned communication channel based on a third user device entering a third room designated as a collaboration space; and adding a third communication device associated with the third user account to the communication channel.

2. The computer-implemented method of claim 1, wherein the adding the third communication device is in response to receiving an input from the first user account to add the third communication device to the communication channel.

3. The computer-implemented method of claim 1, further comprising:

generating a second notification, wherein the second notification includes the first user account, the second user account, and a topic of the communication channel; and sending the second notification to the third communication device.

4. The computer-implemented method of claim 1, further comprising:

determining that a fifth communication device associated with a fifth user account has a second communication channel open with a sixth communication device associated with a sixth user account;

determining the first user account and the third user account are part of a common group;

merging the fifth communication device and the sixth communication device into the communication channel; and closing the second communication channel.

5. The computer-implemented method of claim 1, further comprising:

locking, in response to a second input from the second user account, the communication channel;

determining that a fourth collaboration score is above the threshold, wherein the fourth collaboration score is associated with a fourth user account and a fourth communication device; and preventing, in response to the locking, the fourth communication device from joining the communication channel.

6. The computer-implemented method of claim 1, wherein each physical location includes two or more rooms, and each room is associated with a room designation.

7. The computer-implemented method of claim 6, wherein each location within each physical location is determined by an internet of things (IoT) device in each physical location, and the physical location is based on the room designation.

8. The computer-implemented method of claim 7, wherein the first collaboration score being above the threshold is based on determining that a first location of the first communication device is located in a first room with a collaboration room designation.

9. The computer-implemented method of claim 8, wherein each communication device includes a virtual reality system.

10. The computer-implemented method of claim 9, wherein the communication channel includes generating an avatar for each user account in the communication channel, wherein each avatar is viewable on each virtual reality device.

11. A system comprising:

a processor; and a computer-readable storage medium communicatively coupled to the processor and storing program instructions which, when executed by the processor, are configured to cause the processor to:

identify a plurality of user accounts, wherein each user account is associated with a communication device, and each communication device is associated with a different physical location;

determine, a location for at least two of the devices within each physical location moves to a room designated as a collaboration space from a room designated as a workstation, wherein the room designated as a collaboration space is not designated as a workstation and the room designated as a collaboration space is a location compatible with initiating unplanned conversations;

generate, for the at least two accounts of the plurality of accounts, a collaboration score, wherein each collaboration score is based on the location of each;

determine a first collaboration score of a first user account and a second collaboration score of a second user account are above a collaboration threshold;

initiate, automatically and based on the first collaboration score and the second collaboration score being above the threshold, an unplanned communication channel between a first communication device associated with the first user account and a second communication device associated with the second user account;

determine, in response to the initiating, that a third user account of the plurality of user accounts has a third collaboration score above the threshold;

send a notification to the first communication device and the second communication device through the unplanned communication channel, wherein the notification includes an owner of the third user account, and an indication the third user account is available to join the unplanned communication channel based on a third user device entering a third room designated as a collaboration space; and add a third communication device associated with the third user account to the communication channel.

12. The system of claim 11, wherein the program instructions are further configured to cause the processor to:

generate a second notification, wherein the second notification includes the first user account, the second user account, and a topic of the communication channel; and send the second notification to the third communication device.

13. A computer program product, the computer program product comprising a computer readable storage medium having program instructions embodied therewith, the program instructions executable by a processing unit to cause the processing unit to:

identify a plurality of user accounts, wherein each user account is associated with a communication device, and each communication device is associated with a different physical location;

determine, a location for at least two of the devices within each physical location moves to a room designated as a collaboration space from a room designated as a workstation, wherein the room designated as a collaboration space is not designated as a workstation and the room designated as a collaboration space is a location compatible with initiating unplanned conversations;

generate, for the at least two accounts of the plurality of accounts, a collaboration score, wherein each collaboration score is based on the location of each;

determine a first collaboration score of a first user account and a second collaboration score of a second user account are above a collaboration threshold;

initiate, automatically and based on the first collaboration score and the second collaboration score being above the threshold, an unplanned communication channel between a first communication device associated with the first user account and a second communication device associated with the second user account;

determine, in response to the initiating, that a third user account of the plurality of user accounts has a third collaboration score above the threshold;

send a notification to the first communication device and the second communication device through the unplanned communication channel, wherein the notification includes an owner of the third user account, and an indication the third user account is available to join the unplanned communication channel based on a third user device entering a third room designated as a collaboration space; and add a third communication device associated with the third user account to the communication channel.

14. The computer program product of claim 13, wherein the program instructions are further configured to cause the processing unit to:

generate a second notification, wherein the second notification includes the first user account, the second user account, and a topic of the communication channel; and send the second notification to the third communication device.

15. The computer program product of claim 14, wherein each physical location includes two or more rooms, and each room is associated with a room designation, each location within each physical location is determined by an internet of things (IoT) device in each physical location, and the physical location is based on the room designation.

16. The method of claim 1, wherein the room designated as a collaboration space is selected from the group consisting of break room, living room, and kitchen.

* * * * *